(12) United States Patent
Lillelund et al.

(10) Patent No.: US 6,450,348 B1
(45) Date of Patent: Sep. 17, 2002

(54) MODULAR DISPLAY RACK

(75) Inventors: Stig Lillelund, Hentofte; Jakob Heiberg, Charlottenlund; Ian Tomas Benzon, Copenhagen, all of (DK); Robert H. C. M. Daenen, Aalst (BE)

(73) Assignee: Dart Industries Inc., Orlando, FL (US)

( * ) Notice: Subject to any disclaimer, the term of this patent is extended or adjusted under 35 U.S.C. 154(b) by 0 days.

(21) Appl. No.: 09/862,091

(22) Filed: May 21, 2001

(51) Int. Cl.7 .............................................. A47G 29/00
(52) U.S. Cl. .................. 211/71.01; 211/126.2; 211/194
(58) Field of Search ............... 211/74, 189, 194, 211/71.01, 85.4, 13.1, 126.2, 126.12, 117, 50, 49.1, 55; 206/504, 509–512, 505

(56) References Cited

U.S. PATENT DOCUMENTS

| | | | |
|---|---|---|---|
| 2,654,485 A | | 10/1953 | Bishop et al. |
| 4,083,456 A | * | 4/1978 | Genn et al. ................ 211/55 |
| D267,387 S | | 12/1982 | Koch |
| D323,766 S | | 2/1992 | Robbins et al. |
| 5,085,328 A | * | 2/1992 | Evenson ................ 211/55 |
| 5,222,609 A | * | 6/1993 | Eaton ................ 211/55 |
| D347,769 S | | 6/1994 | Kibbe |
| 5,641,074 A | * | 6/1997 | Smed ................ 211/55 |
| 5,823,359 A | * | 10/1998 | Harris et al. ................ 211/55 |
| 5,848,709 A | * | 12/1998 | Gelphman et al. ......... 211/41.12 |
| 6,012,582 A | * | 1/2000 | Haygeman et al. ........ 211/126.2 |
| 6,056,616 A | * | 5/2000 | Velles ................ 211/55 |
| 6,102,217 A | * | 8/2000 | Mathy et al. ............. 211/85.7 |
| 6,213,313 B1 | * | 4/2001 | Levy ................ 211/51 |

* cited by examiner

*Primary Examiner*—Daniel P. Stodola
*Assistant Examiner*—Jennifer E. Novosad
(74) *Attorney, Agent, or Firm*—Taylor J. Ross

(57) ABSTRACT

A modular display rack having a main panel from which extends a support shelf for holding the articles to be displayed. A handle aperture extends through the main panel. The main panel includes a rear support foot with a connector portion which mates with a connector section on the top edge of the main panel, and a connector prong extending from its rear face at a position to engage the handle aperture when the connector portion mates with the connector section. The main panel may also include a male snap connector and a female snap connector positioned to secure the modular connector racks together with rear faces of the main panels opposed. Multiple modular display racks may thus be assembled together.

3 Claims, 4 Drawing Sheets

MODULAR DISPLAY RACK

CROSS-REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to household display racks for food storage containers, such as spice containers. In particular, the present invention relates to an improved modular display rack which may be used as a single unit or attached with identical units in a modular manner for increased storage capacity.

Display racks for household food storage containers, such as spice containers, are well known. In their most simple form, these are small shelves intended to be mounted upon a wall. Other arrangements take the form of a rack supported upon a counter top, with the containers suspended thereon.

While these prior art devices are acceptable, it is desirable to provide for increased storage capacity at a later date. Additionally, it would be desirable to provide a device which may be hung from a wall or rest upon a counter top, at the user's discretion.

SUMMARY OF THE INVENTION

An object of the present invention is to provide a modular display rack which permits use in a variety of positions, including supported on a horizontal surface, hung from a vertical surface, or suspended.

Another object of the present invention is to provide such a rack which may be quickly and easily assembled together with one or more other such racks to increase storage capacity on the racks.

These and other objects are achieved by a modular display rack having a main panel from which extends a support shelf for holding the articles to be displayed. A handle aperture extends through the main panel. The main panel includes a rear support foot with a connector portion which mates with a connector section on the top edge of the main panel, and a connector prong extending from its rear face at a position to engage the handle aperture when the connector portion mates with the connector section. The main panel may also include a male snap connector and a female snap connector positioned to secure the modular connector racks together with rear faces of the main panels opposed. Multiple modular display racks may thus be assembled together.

BRIEF DESCRIPTION OF THE DRAWINGS

The objects and feature s of the invention noted above are explained in more detail with reference to the drawings, in which like reference numerals denote like elements, and in which.

DETAILED DESCRIPTION OF THE INVENTION

Figure 1:
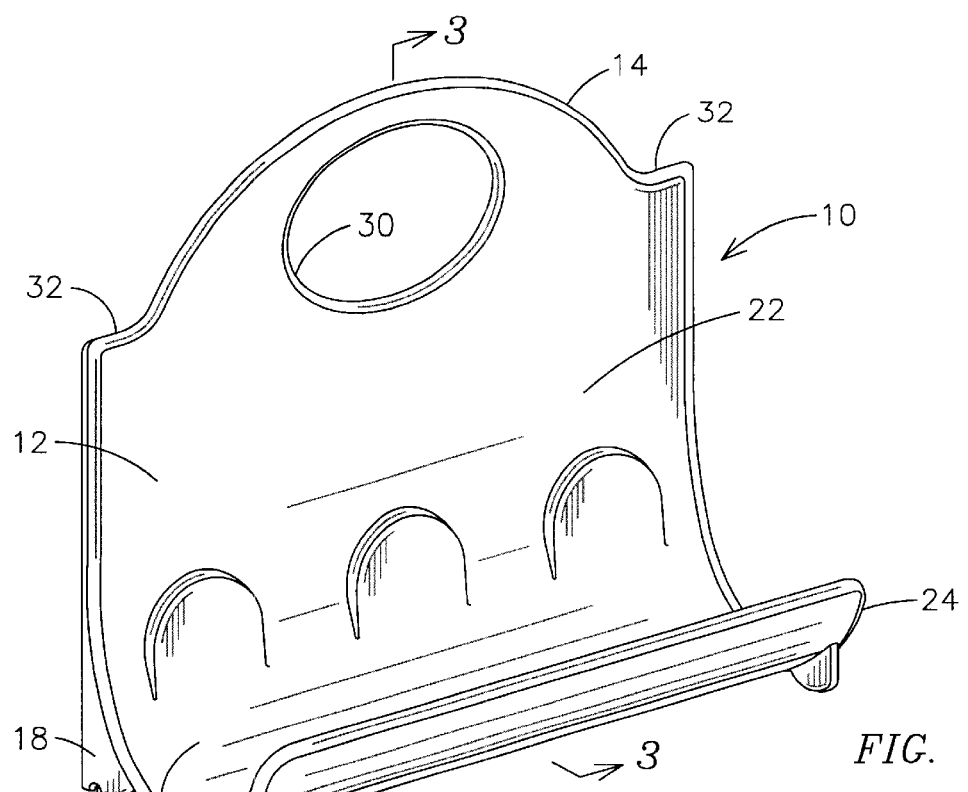
FIG. 1 is a front, side, and top perspective view of the rack according to the present invention.
Figure 2:
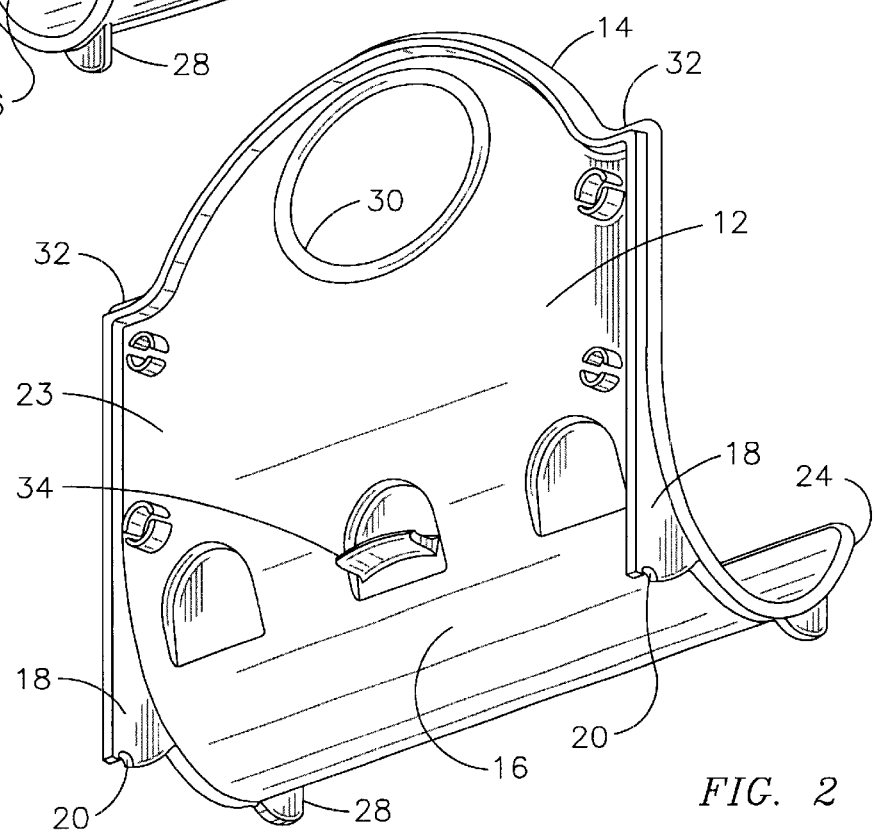
FIG. 2 is a rear, side and bottom perspective view of the rack of FIG. 1.
Figure 3:
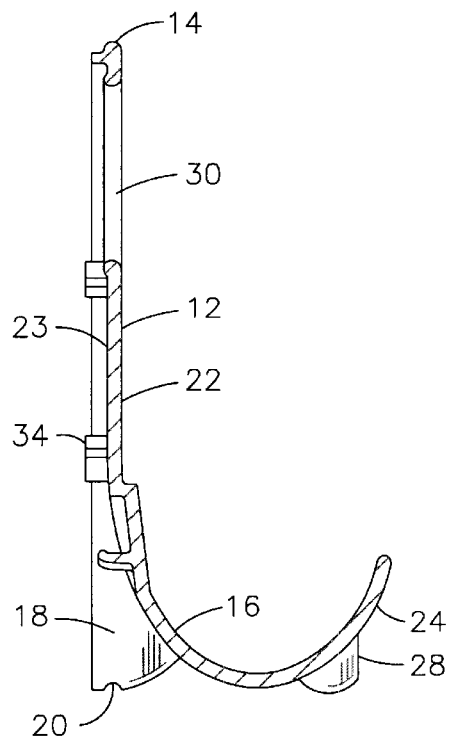
FIG. 3 is a cross-sectional view along line 3—3 of FIG. 1.

With reference to FIG. 1, a modular display rack according to the present invention is generally designated by reference numeral 10. The rack 10 includes a main panel 12 oriented substantially vertically between a top edge 14 and a bottom edge 16. A rear support foot 18 is formed upon the bottom edge 16 at spaced positions, and preferably adjacent the lateral ends. Each rear support foot 18 includes a connector portion 20. In the embodiment shown, the connector portion takes the form of a depression or notch in the rear support foot. Other arrangements for connector portions could also be employed (and will become more clear upon the later description of their use), such as a projection (not shown).

The main panel 12 includes a front face 22 and a rear face 23. Extending forwardly from the main panel 12 is a support shelf 24 intended to hold the articles 26 (FIG. 6) to be displayed upon the modular display rack 10. This support shelf 24 may be a simple planar member (not shown) extending horizontally forward, or take other shapes which are more complex. In the embodiment shown, for example, the support shelf 24 has an upwardly curved elliptical shape intended to more closely conform to elliptical articles 26. As such, the bottom edge 16 is not as clearly defined, but is included within the smooth curvature. The support shelf 24 need not extend uninterrupted along the lateral length of the main panel 12, as is shown. The support shelf 24 could be designed to include a portion in the same horizontal plane as the rear support foot 18, such that the modular display rack 10 may be rest upon the rear feet 18 and the support shelf 24 (not shown). Alternatively, and as shown, the support shelf 24 may include at least one front support foot 28 which lies in the same plane as the rear support foot 18 such that the front and rear support feet 18 and 28 may retain the modular display rack 10 in an upright and stable position upon a horizontal surface.

This arrangement will permit a single modular display rack 10 to rest upon a horizontal surface and display the article or articles 26. It is desired, however, to provide additional functionality. To that end, the main panel 12 includes a handle aperture 30. This handle aperture is preferably sized and placed to permit manual grasping of the modular display rack 10 by the user for transport. Additionally, the modular display rack 10 may be hung from an hook (not shown) upon a vertical surface. As such, with the handle aperture 30, the modular display rack 10 may rest upon a horizontal surface or be hung from a vertical surface.

Figure 5:
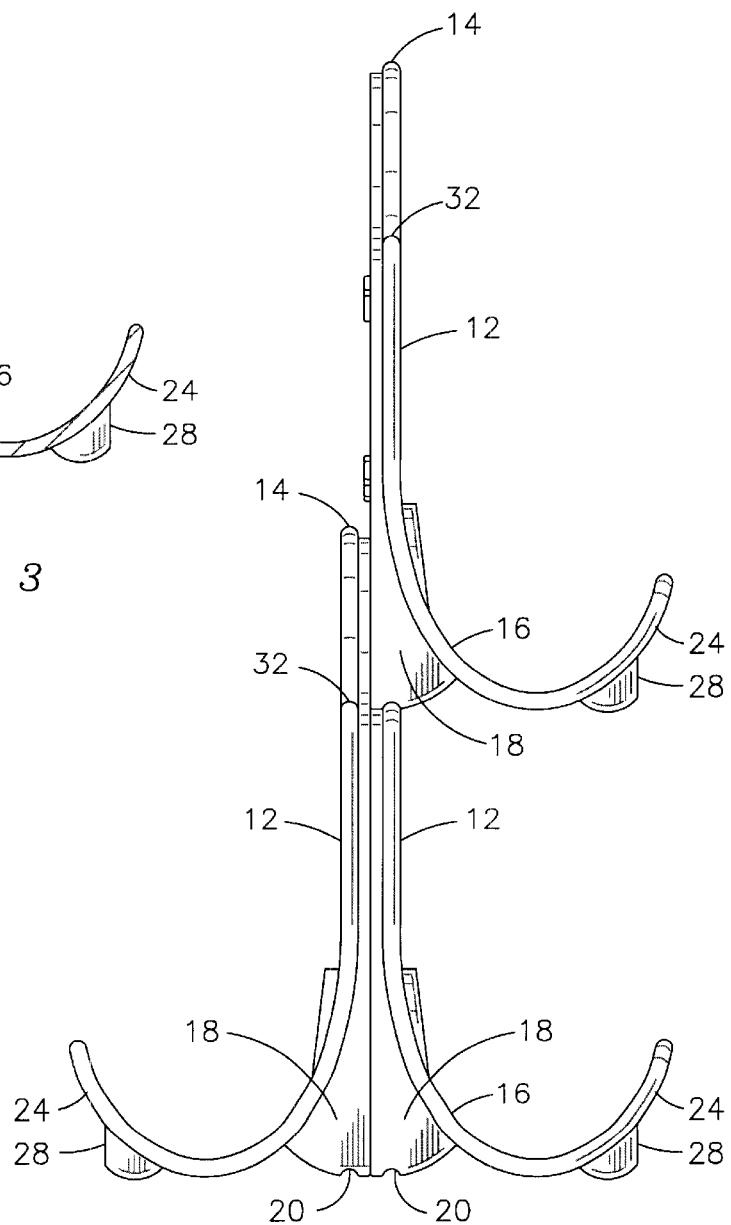
FIG. 5 is a side view of three racks connected together.
Figure 4:
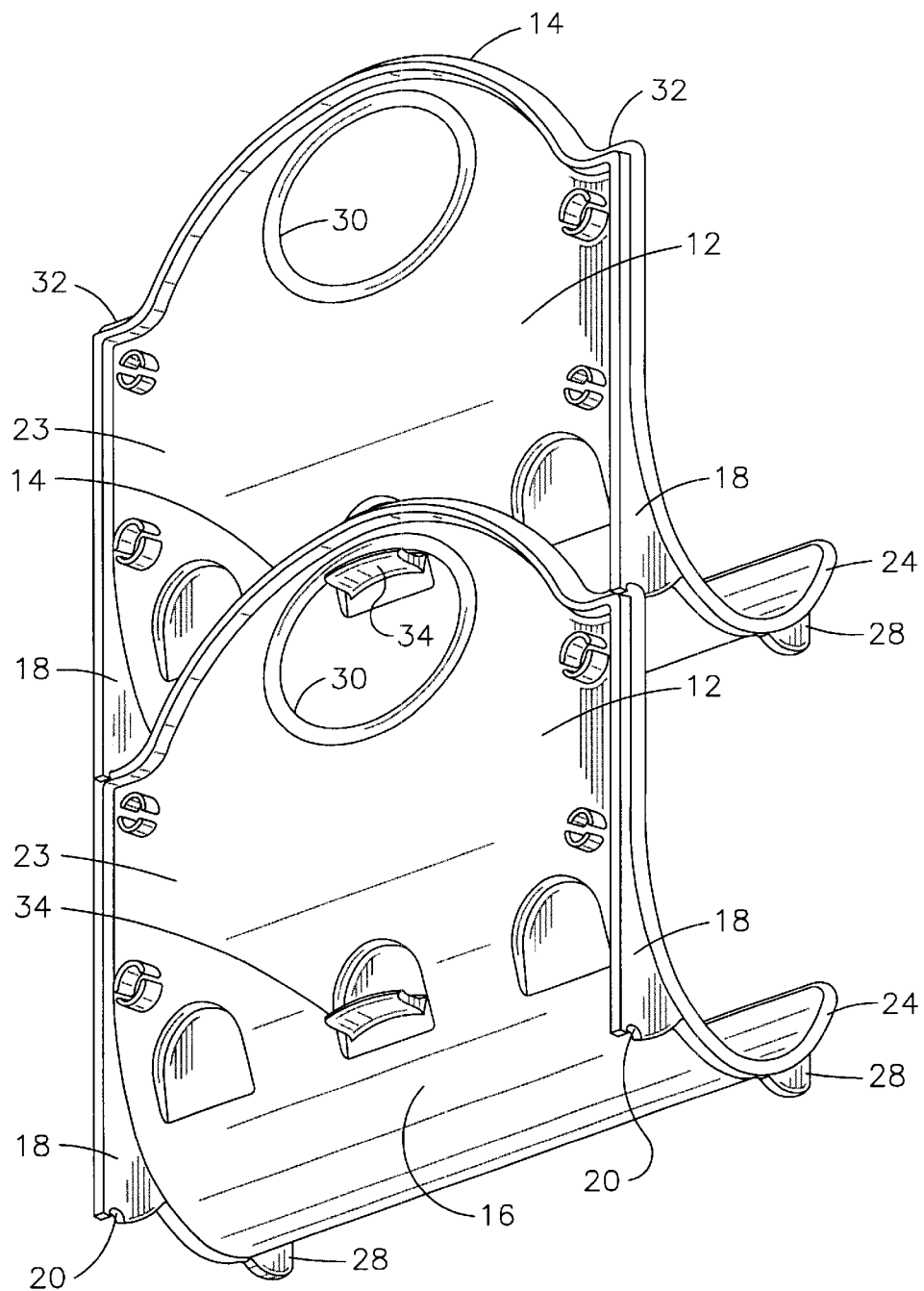
FIG. 4 is a perspective view as in FIG. 2, of a pair of the racks stacked vertically.
Figure 6:
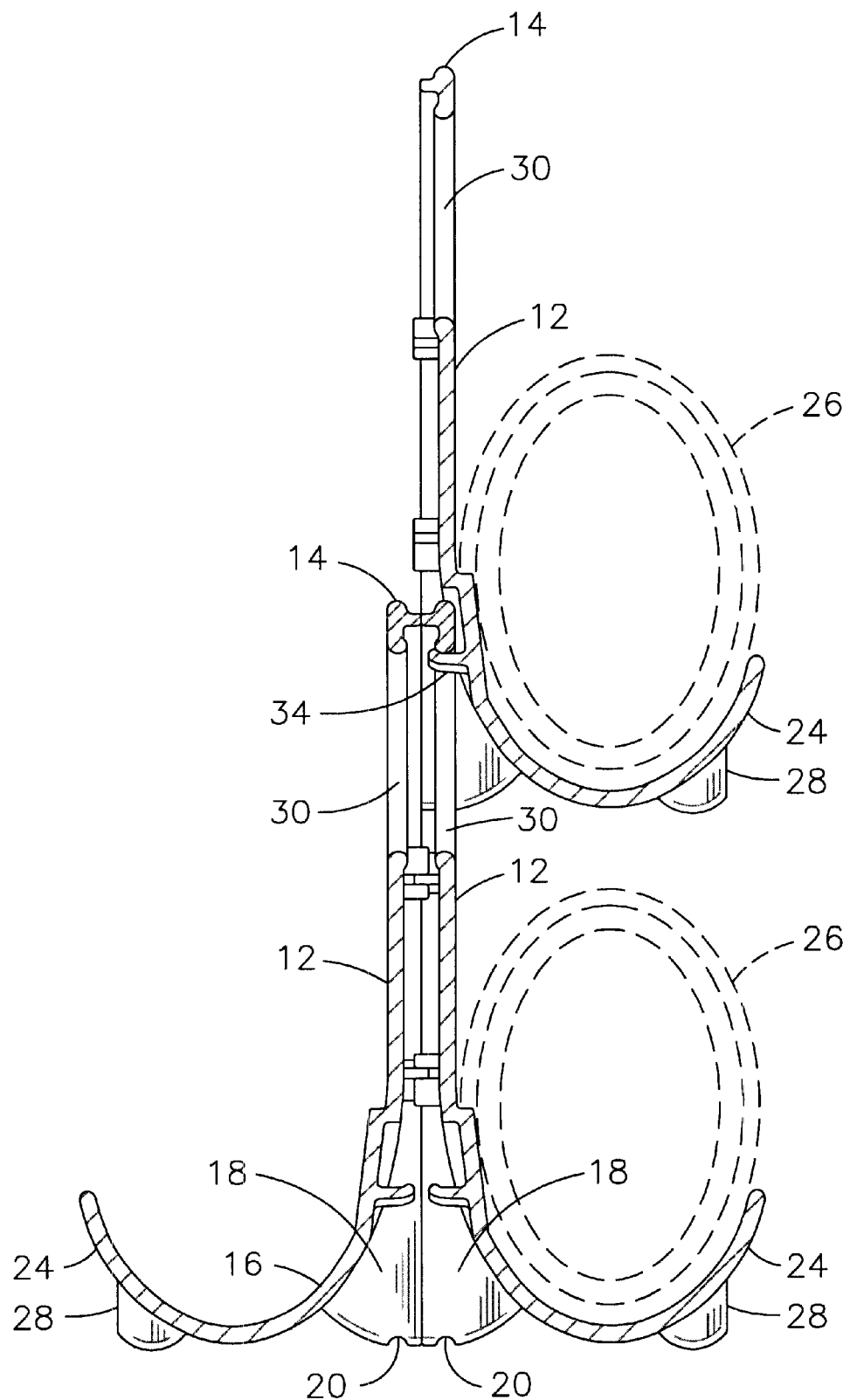
FIG. 6 is a cross-sectional view of the connected racks of FIG. 5, along a line equivalent to line 3—3 of FIG. 1.

To provide further functionality, the top edge 14 includes one or more connector sections 32, each at positions corresponding to the rear support foot 18. The connector section 32 includes or defines a mating surface for the connector portion 20, such that a second modular display rack 10 may be placed upon a first with the connector portion 20 of the second resting upon, and mating with, the connector section of the first, as illustrated in FIGS. 4–6. This is referred to as the vertically assembled position.

This mating of connector portion 20 and connector section 32 is not sufficient to retain the two modular display racks together, however. To complete the assembly, the main panel 12 further includes at least one connector prong 34 extending from the rear face 23 at a position to engage, with a snap fit, the periphery of a second modular display rack 10 upon which it is resting in the vertically assembled position.

As may be seen, the mating connection of the connector portion 20 and connector section 32, together with the snap fit connection of the handle portion 30 and connector prong 34, will securely retain the two modular display racks 10 in the vertically asseembled position. For added stability, it is preferred that the mating connection and snap fit connection be vertically offset, as shown.

With this arrangement the storage capacity of articles 26 may be increased by adding one or more modular display racks 10 upon an existing modular display rack 10 in the vertically assembled position. The assembled modular display racks 10 may still be employed upon a horizontal surface, hung from a vertical surface, or simply suspended. As may be seen this greatly increases the utility of the invention.

To further increase utility, it is also preferred that the rear face of each modular display rack 10 include at least one male snap fit connector 36 and at least one female snap fit connector 38 extending from the rear face 23, at positions which are substantially mirror symmetric about the vertical center line of the modular display rack. With this arrangement, two modular display racks 10 may be placed upon the same horizontal surface with the rear faces 23 in opposing relationship to thus bring their respective male and female snap connectors 34 and 36 into mating position, as illustrated in FIGS. 5 and 6. This is referred to as the horizontally assembled position.

As illustrated in these figures, a pair of horizontally assembled modular display racks are not prohibited from increasing storage capacity in the vertical direction. Specifically, one or both of two modular display racks 10 secured together in the horizontally assembled position may have a third (and fourth, though not shown) modular display rack 10 secured thereto in the vertically assembled position. The addition of further modular display racks 10 is still not prohibited, but yet more may be added. These assembled modular display racks 10 may still be supported on a horizontal surface, upon a vertical surface, or suspended.

As may be seen, the modular display rack 10 according to the present invention provides the user with a variety of mounting possibilities, as well as with the possibility of increasing storage capacity as desired. From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. A modular display rack having a main panel with top and bottom edges, a handle aperture extending through said main panel and sized to receive at least a portion of a human hand for manual movement of said modular display rack, and a support shelf extending from said main panel for displaying articles, the improvement comprising:

at least one rear support foot extending from said main panel and having a connector portion;

at least one connector section located on said top edge in position for mating with said connector portion of a second one of said modular display racks in a vertically assembled position; and at least one connector prong extending from a rear face of said main panel and positioned such that said connector prong will engage at least a portion of a periphery of said handle aperture of a second one of said modular display racks in said vertically assembled position.

2. A modular display rack as in claim 1, wherein said portion of a periphery of said handle aperture and said connector section are vertically offset.

3. A modular display rack as in claim 1, further including at least one male snap connector and at least one female snap connector extending from said rear face of said main panel, and positioned substantially mirror symmetric about a vertical center line of said main panel, such that said male and female snap connectors of two of said modular display racks may be secured together with said rear faces opposed in a horizontally assembled position.

* * * * *